UNITED STATES PATENT OFFICE

HOWARD PORTER DECHERT, OF NEW YORK, N. Y.

IMPROVEMENT IN TREATING OXIDIZABLE METALS WITH CHLORIDE OF CALCIUM.

Specification forming part of Letters Patent No. 155,368, dated September 29, 1874; application filed December 30, 1873.

*To all whom it may concern:*

Be it known that I, HOWARD P. DECHERT, of the city, county, and State of New York, have invented a new and useful Method of Treating Oxidizable Metals with Chloride of Calcium, in connection with an oxide of a metal, such as nickel, antimony, copper, manganese, tin, and iron; and I do hereby declare that the following is a full, clear, and exact description of the same.

My invention consists in the application of chloride of calcium, either dissolved in water or melted in its water of crystallization, and the oxide of a metal, such as nickel, antimony, copper, manganese, tin, or iron, in the oxidization of all oxidizable metals, especially tin and zinc; or in separating the more-freely oxidizable metal from the less-freely oxidizable one, when the two have been united, either as a coating or alloy, as the tin from iron in tinned iron, (such as tinners' clippings,) tin from lead in tin-foil, tin from copper in electrotype copper shells, or in the obtaining of hydrated oxide by deposition.

I employ chloride of calcium obtained in any manner, consisting of chlorine and calcium, (ordinarily prepared by dissolving lime in hydrochloric acid and water,) there being one equivalent of chlorine to one of calcium.

I obtain, by concentration, a solution of chloride of calcium of the strength of about one part, by weight, of chloride of calcium and one of water.

Into this heated solution I introduce the tinned iron, and add a sufficient amount of hydrated oxide or suboxide of copper, proportioned to the amount of metal to be acted upon. The solution is then steadily boiled for about an hour, all water evaporated in this process being replaced by fresh water. At the end of this time the iron is removed, and a fresh supply of iron coated with tin is introduced, and also a fresh supply of hydrated oxide or suboxide of copper.

The iron is well washed after removal from the boiling-vessel, and is ready to be remanufactured as scrap-iron. The water with which it has been washed is allowed to settle, and is then used in filling up the boiling-vessel, as described above.

All the oxide removed by the washing of the iron, and obtained by the settling of the water, consisting of copper suboxide, lead oxide, (an adulteration of the tin used in the tinning process,) and tin oxide, is found at the bottom of the settling-vessel in layers. The tin oxide is the lightest, and can be poured off by itself. The copper suboxide and lead oxide are at the bottom.

The liquid of the boiling-vessel gradually becomes so much charged with dehydrated copper suboxide, lead oxide, and tin oxide as to impede the process. Water is then mixed with it, and it is poured off to settle, as the washing-liquid described above. After settling, the chloride-of-calcium solution is reintroduced into the boiling-vessel, and used, as before, again and then again continuously.

The tin oxide is dried and reduced, in an ordinary reverberatory furnace, to its metallic form. The precipitated suboxide of copper and oxide of lead are then dried and heated, and then the black oxide of copper dissolved out by acid, forming a copper salt, from which the hydrated oxide or suboxide is again obtained.

By the same process tin is removed from the surface of copper shells, and from lead in thin waste tin-foil.

The action of the process is this: Chloride of calcium has the peculiar properties of dissolving the hydrate suboxide and oxide of copper, and admitting and sustaining the boiling process, by means of which such oxide is brought into close contact with the tin, and imparts some of its oxygen to it. The suboxide is, by the boiling process, first raised to oxide, and then acts. A part of the precipitated suboxide of copper becomes dehydrated, while a part is reoxidized at the expense of the water, and again acts upon the tin. The presence of the removed oxide of tin, to a limited extent, serves to facilitate the process, probably by its thickening the liquid, and furnishing some of the oxygen required.

The cold solution, containing hydrated oxide of nickel, antimony, copper, manganese, tin, or iron, acts upon zinc without boiling. The oxide loses part of its oxygen to the zinc, which it hydrates, and itself settles in a dehydrated oxide form.

My discovery consists in applying the solvent properties of chloride of calcium to the use described, and is advantageous in the way of economically removing tin from its adhesion to other metals. Its effect upon iron is not so considerable as to eat up the iron on which the tin forms a coating, or to prevent the use of cast-iron pots or caldrons as boiling-vessels.

I claim—

The application of chloride of calcium, substantially in the manner and for the purpose set forth.

HOWARD PORTER DECHERT.

Witnesses:
    WILLIAM TURNBRIDGE,
    F. KING.